July 14, 1942.    D. MARINSKY ET AL    2,289,586
HERMETIC SEPARABLE FASTENER
Filed Nov. 29, 1940
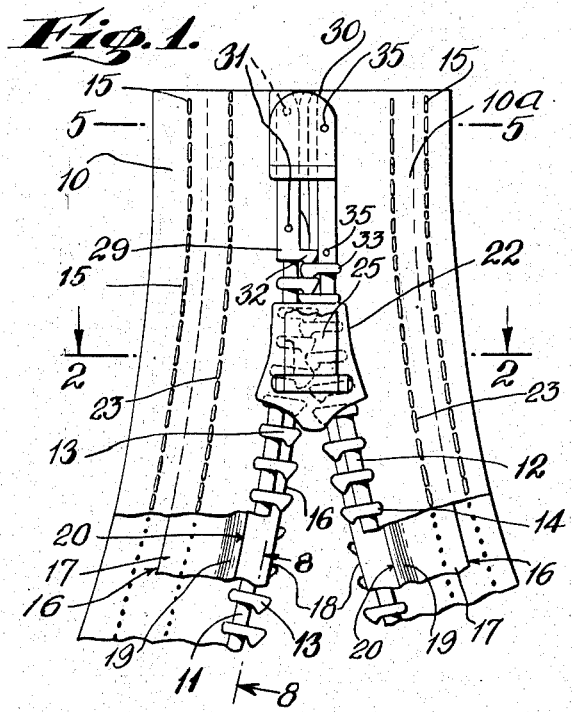
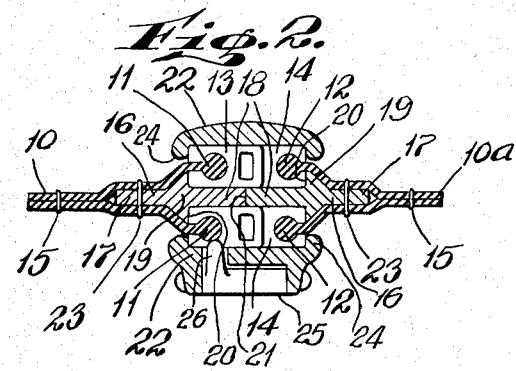
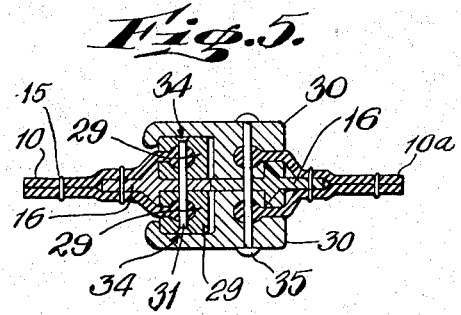
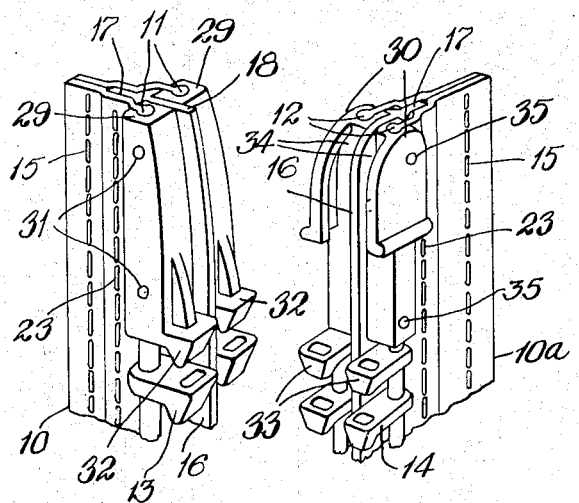
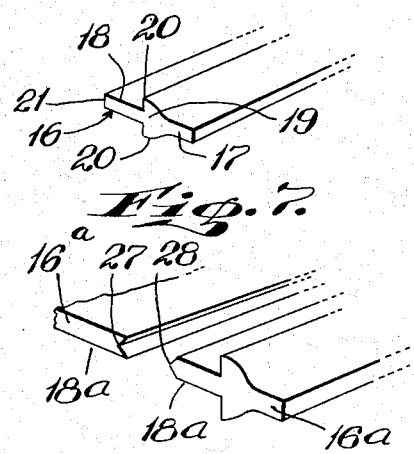
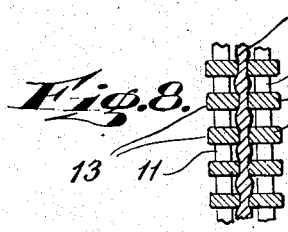
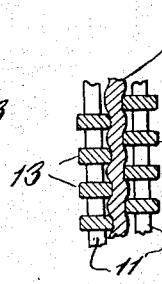
INVENTORS
DAVIS MARINSKY
LOUIS H. MORIN
BY
Lifford, Scull & Burgess
ATTORNEYS Patented July 14, 1942

2,289,586

UNITED STATES PATENT OFFICE 2,289,586

HERMETIC SEPARABLE FASTENER

Davis Marinsky and Louis H. Morin, Bronx, N. Y.

Application November 29, 1940, Serial No. 367,698

16 Claims. (Cl. 24—205)

This invention relates to articles of manufacture, commonly termed separable fasteners, employing stringers coupled by a slider movable longitudinally of the stringers. More particularly the invention relates to a fastener of this type and kind employing means establishing between the coupled stringers a hermetic seal, thereby adapting the fasteners to many uses where it is desirable to form in the opening of a garment, object or article, closed by the fastener, a seal against gases, fluids and the like. The novel features of the invention will be best understood from the following description when taken together with the accompanying drawing, in which certain embodiments of the invention are disclosed and in which the separate parts are designated by suitable reference characters in each of the views, and in which:

Fig. 1 is a plan view of one end portion of a fastener made according to my invention with parts of the construction broken away.

Fig. 2 is a section on the line 2—2 of Fig. 1 on an enlarged scale.

Fig. 3 is a perspective view of one end portion of one of the stringers detached.

Fig. 4 is a perspective view of the corresponding end of the companion stringer detached.

Fig. 5 is an enlarged section on the line 5—5 of Fig. 1.

Fig. 6 is a detail view of a sealing strip which is employed showing the same detached.

Fig. 7 is a detail view of adjacent end portions of two modified forms of sealing strips showing the same in spaced relationship to each other.

Fig. 8 is a partial section on the line 8—8 of Fig. 1 diagrammatically illustrating the arrangement of links of opposed stringers with respect to the intermediate sealing strip; and Fig. 8a is a view similar to Fig. 8 showing another arrangement.

In the construction of separable fasteners of the general type and kind under consideration, it is a well known fact that air and watertight closures are not provided between the links of the stringers. Thus, such devices cannot be used to establish what may be called a seal in the opening which is controlled by the fastener. Several forms of fastening devices have been constructed employing flaps or flanges which abut primarily to form covers or protectors for the fasteners; either to conceal the same or to protect the same from engagement with the body of the wearer when the fasteners are employed on various types of garments.

It is an object of our invention to provide means constituting a unitary part of a slide fastener for establishing a gas and fluid-tight coupling between the stringers and thus between the articles to which the stringers are attached. It will be understood that suitable means is provided to maintain the seal between the stringers and the garment, depending upon the uses to which the invention is applied. Still further, in addition to providing the seal, it is our purpose to provide a reinforced seal of this type which so supports the sealing element as to withstand pressures to which the sealing element may be subjected, in other words, to house sealing strips firmly between pairs of stringer elements in the manner more fully hereinafter set forth.

In the drawing, 10, 10a represents the stringer units of the fastener each unit comprising a pair of free beaded or mounting tape edges 11 and 12 respectively, on which are arranged coupling links or scoops 13, 14 of metallic or plastic types, depending upon the use to which the invention is applied. This structure forms what might be termed link chains. At this time it is well to state that the links will be of such structure as to adapt the same for use when exposed to various types and kinds of fluids or gases.

From the foregoing it will appear that while each stringer unit 10, 10a may comprise a single tape having two beaded side edges to which links 13 or 14 are attached, as illustrated, two complete stringers are employed, and these stringers are arranged one upon the other and stitched, cemented and otherwise secured together as indicated at 15.

In carrying our invention into effect, a sealing strip 16 is arranged between each of the stringer tapes, and particularly the mounting edge portions 11—12 thereof. These strips have outwardly extending tongue portions 17 which are arranged between the central portions of the stringer tapes and also inwardly extending tongue portions 18 which are arranged between and separate the links 13, 13 and 14, 14. These portions are joined by an enlarged intermediate heel portion 19 having upwardly and downwardly extending flanges 20 which seat upon shoulder portions of the links 13, 14 and also retain the stringer tapes against independent flexure with respect to the sealing strips, as is clearly seen in Fig. 2 of the drawing. The inner ends 21 of the tongues 18 abut when the stringers are coupled together by a slider 22 movable along the stringers preferably under slight pressure so as to establish a positive seal at the abutting edges of the sealing strips employed. The degree of this pressure may be varied on different fasteners to adapt the same for different uses as will be apparent. It will be understood that between the interlocked or interengaged portions of the links are clearance spaces which will compensate for the displacement of the rubber as will be apparent. The strip 16 may be secured within and between the stringer tapes or the mounting portions thereof in any desired manner to establish a positive seal between the stringers and also between the article or garment ends which are secured to the stringer tapes. In other words, for primary purposes, the strips 16 may be stitched as seen at 23 and cemented or otherwise secured in position.

The slider 22 is of more or less conventional form except that the inturned flanges 24 of the top and bottom walls thereof will engage the outer surfaces of the two pairs of stringers employed. In some instances, it may be desirable to unite the links under slight pressure engagement upon the strip 16, for example by moving outer links in the direction of inner links so as to establish a close relationship of the link portions of both stringers upon the ends 18 of the strips 16 to reinforce the same against pressures to which these strip ends may be subjected. This pressure will also have a tendency to distort the sealing strips substantially in the manner illustrated in Figs. 8 and 8a of the drawing at points beyond the coupled or interlocked ends, and the degree of this distortion or displacement of the sealing strips may be varied. In Fig. 8 the links of the opposed chains on one stringer are arranged in vertical alinement; whereas in Fig. 8a the links are staggered. With the latter structure it will be understood that the pin and box couplings as in Figs. 3 and 4 will be correspondingly staggered.

The slider 22 will also have a finger piece or pull 25 of any desired construction, and this pull may include a lock element 26 for retaining the pull in locked position on the stringers, or any other means may be provided for this purpose.

In Fig. 7 of the drawing, a slight modification is illustrated wherein the inner ends 18a of strips 16a similar to the strip 16 are provided, one with a recess 27, and the other with a tongue 28 adapted to enter the recess in order to establish a substantial dove-tailed seal joint between adjacent abutting ends of the seal strips when coupled together instead of a single flat surface abutment as is illustrated in the other figures. This type of construction is applicable to thick sealing strips as will be apparent. It will of course be understood that any other form and construction of abutment may be provided to accomplish the desired result.

The strips 16, 16a may be composed of any suitable material, and in many instances, rubber, synthetic rubber, or other suitably resilient materials may be employed. Where it is desirable to maintain the free flexibility of the fastener, particularly in garment uses, it will be desirable to include flexible sealing strips, but otherwise these strips may be made semi-flexible or in fact substantially rigid, except from the standpoint of providing and maintaining sufficient yielding properties at abutting ends thereof to effect and maintain the seal between these strips. In some instances, it may be desirable to use independent sealing means between the abutting links of the strips, particularly in shipping merchandise in containers where the seal may be broken in the opening of the fastener and then re-sealed by the application of additional sealing means. In such latter instances it will of course be apparent that the use of the yieldable material such as rubber, gum, felts and the like, need not necessarily be employed.

In many instances, fasteners of the type and kind under consideration are applied to various types of garments, such as raincoats, windbreakers, and numerous other garments, including garments enveloping the body, and in such uses, it is often desirable to provide means detachably coupling the fastener stringers. For this purpose, we have shown in the drawing the pin parts 29 and box parts 30 for the reception of the pin parts. The pin parts 29 are arranged on the mounting edges 11 and secured thereto by rivet pins 31 which extend through the part 18 of the sealing strip as is clearly represented in Figs. 4 and 5 of the drawing. The pin parts 29 include at their inner ends link portions 32 for engagement with end links 33 of the companion stringers. The box parts 30 each constitute half-channel portions 34 for receiving the pin parts 29, note Fig. 5 of the drawing; the channeled portions being separated by the strip 16. The box parts 30 are united together upon the strip 16 by rivet pins 35, one of which is shown in Fig. 5 of the drawing. With this construction, it will appear that the sealing strips extend to or in other words throughout the full length of the stringers, including the coupling end portions thereof. In fact, the strips 16 may extend beyond these ends, if desired, in certain adaptations of the invention.

In all instances, the tapes and sealing strips of the fastener will be so constructed with respect to the links employed as to maintain adjacent surfaces of the two stringers in close abutting relationship to the sealing strip disposed therebetween to prevent any appreciable independent flexure or movement of the links with respect to the strip in a manner which would break the seal between adjacent abutting ends of the strip while at the same time providing in the complete fastener the desirable flexibility which will adapt the same to the many intended uses. It will also be apparent that in using sealing strips of various types and kinds, the degree of displacement of the strip will be varied.

As an article of manufacture, it will appear that a complete fastener device constitutes a closure means which in its entirety will establish a gas or liquid seal in the opening of an article to which the sealing fastener unit may be applied.

For the purposes of this description the surfaces of the links which are adjacent and which abut the sealing strips, may be said to be the inner surfaces, and the surfaces engaged by the slider walls may be said to be the outer surfaces. It will of course be apparent that the inner abutting ends of the sealing strips terminate inwardly of the coupling ends of the links on the respective link chains, and these ends are disposed substantially in alinement with the center of the coupling portions of the links so as to establish a firm abutment or pressure engagement between the ends of the strips when the stringers are coupled together.

The stringers or the link chains include tape portions which join the links to the parts of the stringer tapes which are attached to the supports. These tape portions serve to support the links or what might be said to be the mounted ends of the links in firm engagement with the sealing strips when the stringers are coupled together. In other words, the slider moves the links toward each other to establish a more or less pressure engagement of the links with the sealing strips, and the aforesaid tape portions of the chains serve to hold the links in position. It will also be understood that the flanges 20 of the heel portions of said strips also contribute in maintaining the links in position while at the same time supporting the tape portions acting as filler members in this respect. It will be understood, however, that when the stringers are detached the said tape portions of the link chains provide for free and independent flexure and movement of the chains toward and from each other, and from this standpoint might be said to be flexible hinges providing the swinging movement of the chains toward and from the sealing strips. Having fully described our invention, what we claim as new and desire to secure by Letters Patent is:

1. A separable fastener comprising stringers adapted to be coupled and uncoupled, each stringer comprising a pair of link chains with a sealing strip disposed between said link chains, single slide means for coupling the link chains of one stringer with those of the companion stringer to maintain the link chains of both stringers in engagement with the sealing strips of both stringers while maintaining adjacent ends of the strips of both stringers in abutting relationship to each other.

2. A separable fastener comprising stringers adapted to be coupled and uncoupled, each stringer comprising a pair of link chains with a sealing strip disposed between said link chains, means for coupling the link chains of one stringer with those of the companion stringer to maintain the link chains of both stringers in engagement with the sealing strips of both stringers while maintaining adjacent ends of the strips of both stringers in abutting relationship to each other, and means retaining the link chains of opposed stringers when coupled together against independent flexure with respect to the sealing strips disposed therebetween.

3. A separable fastener comprising stringers adapted to be coupled and uncoupled, each stringer comprising a pair of link chains with a sealing strip disposed between said link chains, means for coupling the link chains of one stringer with those of the companion stringer to maintain the link chains of both stringers in engagement with the sealing strips of both stringers while maintaining adjacent ends of the strips of both stringers in abutting relationship to each other, means retaining the link chains of opposed stringers when coupled together against independent flexure with respect to the sealing strips disposed therebetween, and the sealing strips of said stringers extending beyond outer edges of the coupled links of said chains to seal the mounting of the stringers with supports in connection with which the same are coupled.

4. A separable fastener comprising stringers adapted to be coupled and uncoupled, each stringer comprising a pair of link chains with a sealing strip disposed between said link chains, means for coupling the link chains of one stringer with those of the companion stringer to maintain the link chains of both stringers in engagement with the sealing strips of both stringers while maintaining adjacent ends of the strips of both stringers in abutting relationship to each other, said means comprising a slider having spaced walls engaging outer surfaces only of the link chains, and the spacing of said walls controlling pressure engagement of the links of said chains with said sealing strips.

5. A separable fastener of the class described comprising two pairs of stringers, each stringer comprising a mounting tape portion and two link supporting tape parts united with the mounting tape portion, each tape part having a plurality of links arranged longitudinally of the free edge thereof, a slider movable longitudinally of the pairs of stringers to couple and uncouple the same, the slider having spaced walls engaging outer side surfaces only of the links of the stringers and so spaced as to maintain adjacent side surfaces of the links in close proximity to each other, and means arranged between adjacent surfaces of the stringer links and supported by said links for forming a seal between the pairs of stringers.

6. A separable fastener of the class described comprising two pairs of stringers, each stringer comprising a mounting tape portion and two link supporting tape parts united with the mounting tape portion, each tape part having a plurality of links arranged longitudinally of the free edge thereof, a slider movable longitudinally of the pairs of stringers to couple and uncouple the same, the slider having spaced walls engaging outer side surfaces only of the links of the stringers and so spaced as to maintain adjacent side surfaces of the links in close proximity to each other, means arranged between adjacent surfaces of the stringer links and supported by said links for forming a seal between the pairs of stringers, said last named means extending onto the tape portions of the stringers beyond the links to establish a seal between that part of the tape portions which are attached to supports in connection with which the stringers are coupled.

7. A separable fastener of the class described comprising two pairs of stringers, each stringer comprising a mounting tape portion and two link supporting tape parts united with the mounting tape portion, each tape part having a plurality of links arranged longitudinally of the free edge thereof, a slider movable longitudinally of the pairs of stringers to couple and uncouple the same, the slider having spaced walls engaging outer side surfaces only of the links of the stringers and so spaced as to maintain adjacent side surfaces of the links in close proximity to each other, means arranged between adjacent surfaces of the stringer links and supported by said links for forming a seal between the pairs of stringers, said last named means extending onto the tape portions of the stringers beyond the links to establish a seal between that part of the tape portions which are attached to supports in connection with which the stringers are coupled, said sealing means comprising strips of yieldable moisture-proof material, and said strips abutting along the line of coupling of the links of opposed stringers.

8. A separable fastener of the class described comprising two stringer units, each unit comprising an attaching tape portion having two link chain portions movable toward and from each other, a sealing strip disposed between said link chain portions and extending onto at least part of the attaching tape portion of the stringer unit, and the link chain portions comprising narrow tape parts joining the attaching plate portion and serving to hold the links of the chain portions in firm engagement with the sealing strip when two stringer units are coupled together.

9. In fastening devices of the class described employing stringers adapted to be coupled and uncoupled by a slider movable longitudinally thereof, each stringer comprising a unit consisting of two relatively movable link chains united to an attaching tape portion, and a sealing strip interposed between the link chains and extending onto at least part of the attaching tape portion and secured thereto.

10. A separable fastener of the class described comprising pairs of stringers, each stringer comprising a central elongated partitioning strip united with an attaching tape portion, a link chain arranged longitudinally of each side of the partitioning strip of each stringer, means movable longitudinally of the stringers to couple and uncouple link chains on common sides of the partitioning strips of each stringer while arranging adjacent ends of the partitioning strips in abutting relationship to each other when the stringers are coupled together, and said link chains comprising flexible parts providing free movement of the chains toward and from the partitioning strips and supporting the links of the chains in firm engagement with the partitioning strips when the pairs of stringers are coupled together.

11. A hermetic closure of the class described comprising a pair of sealing strips, said strips having, at least in part, yieldable material and being arranged for edgewise movement toward and from each other to establish a seal between adjacent edges when brought into engagement with each other, and means on opposed surfaces of the strips for coupling said strips together and for supporting adjacent edges of the strips in firm engagement with each other when said strips are coupled by said means.

12. A hermetic closure of the class described comprising a pair of sealing strips, said strips having, at least in part, yieldable material and arranged for edgewise movement toward and from each other to establish a seal between adjacent edges when brought into engagement with each other, means on opposed surfaces of the strips for coupling said strips together and for supporting adjacent edges of the strips in firm engagement with each other when said strips are coupled by said means, and said means comprising reinforcing elements supporting the engaged strips against independent flexure between said means.

13. A hermetic closure of the class described comprising a pair of sealing strips, said strips having, at least in part, yieldable material and arranged for edgewise movement toward and from each other to establish a seal between adjacent edges when brought into engagement with each other, means on opposed surfaces of the strips for coupling said strips together and for supporting adjacent edges of the strips in firm engagement with each other when said strips are coupled by said means, and means supporting said first named means in pressure engagement with side surfaces of said strips at abutting portions thereof.

14. The combination with separable fastener stringers employing a slider movable longitudinally of the stringers to couple and uncouple the same, of means forming a seal between the stringers when coupled together, said means comprising sealing strips constituting a unitary part of each stringer, and the sealing strip of one stringer being adapted for firm engagement with the sealing strip of the opposed stringer in coupling said stringers together.

15. A hermetic separable fastener comprising two pairs of link chains, one pair of chains having links adapted to be coupled and uncoupled, the other pair of chains being arranged upon the first named pair and comprising links adapted to be coupled and uncoupled, means movable along both pairs of link chains for simultaneously coupling and uncoupling the links thereof, and means disposed between adjacent surfaces of the chains forming a seal between the link chains when the said link chains are coupled together.

16. A hermetic separable fastener comprising two pairs of link chains, one pair of chains having links adapted to be coupled and uncoupled, the other pair of chains being arranged upon the first named pair and comprising links adapted to be coupled and uncoupled, means movable along both pairs of link chains for simultaneously coupling and uncoupling the links thereof, means disposed between adjacent surfaces of the chains forming a seal between the link chains when the said link chains are coupled together, and said coupling means moving the pairs of link chains toward each other into firm engagement with the interposed sealing means in firmly supporting the sealing means between the coupled pairs of link chains.

DAVIS MARINSKY.
LOUIS H. MORIN.